United States Patent
McElroy et al.

(10) Patent No.: US 10,075,650 B2
(45) Date of Patent: *Sep. 11, 2018

(54) VEHICULAR IMAGING SYSTEM WITH CONTROLLED ILLUMINATION DEVICE AND CAMERA

(71) Applicant: MAGNA ELECTRONICS INC., Auburn Hills, MI (US)

(72) Inventors: Clarence P. McElroy, Grand Blanc, MI (US); Yuesheng Lu, Farmington Hills, MI (US); Axel Nix, Birmingham, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 623 days.

This patent is subject to a terminal disclaimer.

(21) Appl. No.: 14/628,351

(22) Filed: Feb. 23, 2015

(65) Prior Publication Data
US 2015/0172527 A1    Jun. 18, 2015

Related U.S. Application Data

(63) Continuation of application No. 12/693,681, filed on Jan. 26, 2010, now Pat. No. 8,964,032.

(60) Provisional application No. 61/148,457, filed on Jan. 30, 2009.

(51) Int. Cl.
| | |
|---|---|
| *H04N 5/235* | (2006.01) |
| *B60Q 1/14* | (2006.01) |
| *B60Q 1/26* | (2006.01) |
| *B60R 11/04* | (2006.01) |

(52) U.S. Cl.
CPC .......... *H04N 5/2354* (2013.01); *B60Q 1/143* (2013.01); *B60Q 1/26* (2013.01); *B60R 11/04* (2013.01); *B60Q 2300/43* (2013.01)

(58) Field of Classification Search
CPC .................................................. H04N 5/2354
See application file for complete search history.

(56) References Cited

U.S. PATENT DOCUMENTS

| | | |
|---|---|---|
| 3,882,268 A | 5/1975 | Ogawa et al. |
| 4,258,979 A | 3/1981 | Mahin |
| 4,600,913 A | 7/1986 | Caine |
| 4,847,772 A | 7/1989 | Michalopoulos et al. |
| 4,907,870 A | 3/1990 | Brucker |
| 4,931,937 A | 6/1990 | Kakinami et al. |

(Continued)

*Primary Examiner* — Hua Fan
(74) *Attorney, Agent, or Firm* — Honigman Miller Schwartz and Cohn, LLP

(57) ABSTRACT

An imaging system of a vehicle includes a tail lamp assembly that illuminates a field of illumination rearward of the vehicle. A light source control operates at least one light source of the tail lamp assembly in a repeating cycle that includes (i) a first illumination period wherein light emitted by the tail lamp assembly has a first brightness level and (ii) a second illumination period wherein light emitted by the tail lamp assembly has a second brightness level that is lower than the first brightness level. A camera is operable to capture image data representative of a region that is at least in part encompassed by the field of illumination. A camera control may operate the camera to capture image data during at least part of the first illumination period and to not capture image data during at least part of the second illumination period.

8 Claims, 4 Drawing Sheets

(56) References Cited

U.S. PATENT DOCUMENTS

| | | |
|---|---|---|
| 4,942,533 A | 7/1990 | Kakinami et al. |
| 4,970,653 A | 11/1990 | Kenue |
| 4,971,430 A | 11/1990 | Lynas |
| 5,070,454 A | 12/1991 | Griffith |
| 5,097,362 A | 3/1992 | Lynas |
| 5,128,874 A | 7/1992 | Bhanu et al. |
| 5,177,685 A | 1/1993 | Davis et al. |
| 5,189,561 A | 2/1993 | Hong |
| 5,294,991 A | 3/1994 | Oshima et al. |
| 5,304,980 A | 4/1994 | Maekawa |
| 5,333,111 A | 7/1994 | Chaiken et al. |
| 5,355,118 A | 10/1994 | Fukuhara |
| 5,365,603 A | 11/1994 | Karmann |
| 5,369,590 A | 11/1994 | Karasudani |
| 5,424,952 A | 6/1995 | Asayama |
| 5,426,294 A | 6/1995 | Kobayashi et al. |
| 5,448,484 A | 9/1995 | Bullock et al. |
| 5,487,116 A | 1/1996 | Nakano et al. |
| 5,497,305 A | 3/1996 | Pastrick |
| 5,497,306 A | 3/1996 | Pastrick |
| 5,500,766 A | 3/1996 | Stonecypher |
| 5,519,590 A | 5/1996 | Crookham et al. |
| 5,521,633 A | 5/1996 | Nakajima et al. |
| 5,521,843 A | 5/1996 | Hashima et al. |
| 5,523,811 A | 6/1996 | Wada et al. |
| 5,530,771 A | 6/1996 | Meakawa |
| 5,537,003 A | 7/1996 | Bechtel et al. |
| 5,541,590 A | 7/1996 | Nishio |
| 5,550,677 A | 8/1996 | Schofield et al. |
| 5,555,555 A | 9/1996 | Sato et al. |
| 5,568,190 A | 10/1996 | Noguchi et al. |
| 5,581,464 A | 12/1996 | Woll et al. |
| 5,596,365 A | 1/1997 | Erickson et al. |
| 5,617,085 A | 4/1997 | Tsutsumi et al. |
| 5,627,586 A | 5/1997 | Yamasaki |
| 5,638,116 A | 6/1997 | Shimoura et al. |
| 5,642,093 A | 6/1997 | Kinoshita et al. |
| 5,642,299 A | 6/1997 | Hardin et al. |
| 5,668,663 A | 9/1997 | Varaprasad et al. |
| 5,670,935 A | 9/1997 | Schofield et al. |
| 5,675,489 A | 10/1997 | Pomerleau |
| 5,715,093 A | 2/1998 | Schierbeek et al. |
| 5,724,187 A | 3/1998 | Varaprasad et al. |
| 5,745,310 A | 4/1998 | Mathieu |
| 5,760,962 A | 6/1998 | Schofield et al. |
| 5,786,772 A | 7/1998 | Schofield et al. |
| 5,790,403 A | 8/1998 | Nakayama |
| 5,796,094 A | 8/1998 | Schofield et al. |
| 5,798,575 A | 8/1998 | O'Farrell et al. |
| 5,837,994 A | 11/1998 | Stam et al. |
| 5,845,000 A | 12/1998 | Breed et al. |
| 5,850,254 A | 12/1998 | Takano et al. |
| 5,877,897 A | 3/1999 | Schofield et al. |
| 5,884,212 A | 3/1999 | Lion |
| 5,890,083 A | 3/1999 | Franke et al. |
| 5,892,855 A | 4/1999 | Kakinami et al. |
| 5,929,784 A | 7/1999 | Kawaziri et al. |
| 5,929,786 A | 7/1999 | Schofield et al. |
| 5,949,331 A | 9/1999 | Schofield et al. |
| 6,005,492 A | 12/1999 | Tamura et al. |
| 6,009,377 A | 12/1999 | Hiwatashi |
| 6,044,321 A | 3/2000 | Nakamura et al. |
| 6,049,619 A | 4/2000 | Anandan et al. |
| 6,097,023 A | 8/2000 | Schofield et al. |
| 6,104,552 A | 8/2000 | Thau et al. |
| 6,149,287 A | 11/2000 | Pastrick et al. |
| 6,163,083 A | 12/2000 | Kramer et al. |
| 6,169,940 B1 | 1/2001 | Jitsukata et al. |
| 6,173,222 B1 | 1/2001 | Seo et al. |
| 6,201,236 B1 | 3/2001 | Juds |
| 6,201,642 B1 | 3/2001 | Bos |
| 6,218,960 B1 | 4/2001 | Ishikawa et al. |
| 6,222,447 B1 | 4/2001 | Schofield et al. |
| 6,226,389 B1 | 5/2001 | Lemelson et al. |
| 6,226,592 B1 | 5/2001 | Luckscheiter et al. |
| 6,243,003 B1 | 6/2001 | DeLine et al. |
| 6,246,961 B1 | 6/2001 | Sasaki et al. |
| 6,249,214 B1 | 6/2001 | Kashiwazaki |
| 6,250,148 B1 | 6/2001 | Lynam |
| 6,269,308 B1 | 7/2001 | Kodaka et al. |
| 6,276,821 B1 | 8/2001 | Pastrick et al. |
| 6,278,377 B1 | 8/2001 | DeLine et al. |
| 6,282,483 B1 | 8/2001 | Yano et al. |
| 6,285,393 B1 | 9/2001 | Shimoura et al. |
| 6,292,111 B1 | 9/2001 | Ishikawa et al. |
| 6,292,752 B1 | 9/2001 | Franke et al. |
| 6,313,454 B1 | 11/2001 | Bos et al. |
| 6,317,057 B1 | 11/2001 | Lee |
| 6,320,176 B1 | 11/2001 | Schofield et al. |
| 6,330,511 B2 | 12/2001 | Ogura et al. |
| 6,341,523 B2 | 1/2002 | Lynam |
| 6,353,392 B1 | 3/2002 | Schofield et al. |
| 6,396,397 B1 | 5/2002 | Bos et al. |
| 6,411,204 B1 | 6/2002 | Bloomfield et al. |
| 6,420,975 B1 | 7/2002 | DeLine et al. |
| 6,433,676 B2 | 8/2002 | DeLine et al. |
| 6,485,155 B1 | 11/2002 | Duroux et al. |
| 6,498,620 B2 | 12/2002 | Schofield et al. |
| 6,509,832 B1 | 1/2003 | Bauer et al. |
| 6,568,839 B1 | 5/2003 | Pastrick et al. |
| 6,580,996 B1 | 6/2003 | Friedrich |
| 6,590,719 B2 | 7/2003 | Bos |
| 6,594,583 B2 | 7/2003 | Ogura et al. |
| 6,637,915 B2 | 10/2003 | von Wolske |
| 6,671,607 B2 | 12/2003 | Ishizu et al. |
| 6,672,745 B1 | 1/2004 | Bauer et al. |
| 6,690,268 B2 | 2/2004 | Schofield et al. |
| 6,691,008 B2 | 2/2004 | Kondo et al. |
| 6,708,100 B2 | 3/2004 | Rsell et al. |
| 6,717,610 B1 | 4/2004 | Bos et al. |
| 6,748,312 B2 | 6/2004 | Rsell et al. |
| 6,757,109 B2 | 6/2004 | Bos |
| 6,760,471 B1 | 7/2004 | Raymond |
| 6,823,241 B2 | 11/2004 | Shirato et al. |
| 6,824,281 B2 | 11/2004 | Schofield et al. |
| 6,882,287 B2 | 4/2005 | Schofield |
| 6,928,180 B2 | 8/2005 | Stam et al. |
| 6,941,216 B2 | 9/2005 | Isogai et al. |
| 6,946,978 B2 | 9/2005 | Schofield |
| 6,968,266 B2 | 11/2005 | Ahmed-Zaid et al. |
| 7,005,974 B2 | 2/2006 | McMahon et al. |
| 7,012,727 B2 | 3/2006 | Hutzel et al. |
| 7,038,577 B2 | 5/2006 | Pawlicki et al. |
| 7,049,945 B2 | 5/2006 | Breed et al. |
| 7,111,968 B2 * | 9/2006 | Bauer .................. B60Q 1/0023 340/425.5 |
| 7,151,844 B2 | 12/2006 | Stevenson et al. |
| 7,188,963 B2 | 3/2007 | Schofield et al. |
| 7,295,682 B2 | 11/2007 | Otsuka et al. |
| 7,370,983 B2 | 5/2008 | DeWind et al. |
| 7,388,475 B2 | 6/2008 | Litkouhi |
| 7,391,014 B2 | 6/2008 | Saccagno |
| 7,420,592 B2 | 9/2008 | Freeman |
| 7,446,650 B2 | 11/2008 | Schofield et al. |
| 7,463,138 B2 | 12/2008 | Pawlicki et al. |
| 7,526,103 B2 | 4/2009 | Schofield et al. |
| 7,561,064 B2 | 7/2009 | Yamamoto |
| 7,565,006 B2 | 7/2009 | Stam et al. |
| 7,579,939 B2 | 8/2009 | Schofield et al. |
| 7,579,940 B2 | 8/2009 | Schofield et al. |
| 7,583,184 B2 | 9/2009 | Schofield et al. |
| 7,619,508 B2 | 11/2009 | Lynam et al. |
| 7,720,580 B2 | 5/2010 | Higgins-Luthman |
| 7,764,808 B2 | 7/2010 | Zhu et al. |
| 7,877,175 B2 | 1/2011 | Higgins-Luthman |
| 7,965,336 B2 | 6/2011 | Bingle et al. |
| 7,991,522 B2 | 8/2011 | Higgins-Luthman |
| 8,044,776 B2 | 10/2011 | Schofield et al. |
| 8,072,318 B2 | 12/2011 | Lynam et al. |
| 8,116,929 B2 | 2/2012 | Higgins-Luthman |
| 8,239,086 B2 | 8/2012 | Higgins-Luthman |
| 8,964,032 B2 | 2/2015 | McElroy et al. |
| 2002/0003571 A1 | 1/2002 | Schofield et al. |
| 2002/0159270 A1 | 10/2002 | Lynam et al. |

(56) References Cited

U.S. PATENT DOCUMENTS

| | | |
|---|---|---|
| 2002/0188392 A1 | 12/2002 | Breed et al. |
| 2003/0025597 A1 | 2/2003 | Schofield |
| 2003/0052773 A1 | 3/2003 | Sjonell |
| 2003/0156015 A1 | 8/2003 | Winner et al. |
| 2003/0169522 A1 | 9/2003 | Schofield et al. |
| 2003/0236622 A1 | 12/2003 | Schofield |
| 2004/0062050 A1 | 4/2004 | Wolske |
| 2004/0145457 A1 | 7/2004 | Schofield et al. |
| 2004/0149504 A1 | 8/2004 | Swoboda et al. |
| 2005/0232469 A1 | 10/2005 | Schofield et al. |
| 2006/0050018 A1 | 3/2006 | Hutzel et al. |
| 2006/0125919 A1 | 6/2006 | Camilleri et al. |
| 2006/0164230 A1 | 7/2006 | DeWind et al. |
| 2006/0171704 A1 | 8/2006 | Bingle et al. |
| 2007/0132567 A1 | 6/2007 | Schofield et al. |
| 2007/0171037 A1 | 7/2007 | Schofield et al. |
| 2007/0262882 A1 | 11/2007 | Yamamoto |
| 2008/0144924 A1 | 6/2008 | Hoffmann |
| 2008/0212215 A1 | 9/2008 | Schofield et al. |
| 2009/0067184 A1 | 3/2009 | Kamioka et al. |
| 2009/0086496 A1 | 4/2009 | Todani et al. |
| 2009/0290369 A1 | 11/2009 | Schofield et al. |
| 2010/0002071 A1 | 1/2010 | Ahiska |
| 2010/0045790 A1 | 2/2010 | Lynam et al. |
| 2010/0321946 A1 | 12/2010 | Dingman et al. |
| 2011/0090338 A1 | 4/2011 | DeLine et al. |
| 2011/0249120 A1 | 10/2011 | Bingle et al. |
| 2012/0062744 A1 | 3/2012 | Schofield et al. |
| 2012/0062746 A1 | 3/2012 | Otsuka et al. |
| 2012/0086808 A1 | 4/2012 | Lynam et al. |
| 2012/0120239 A1 | 5/2012 | Hutzel et al. |
| 2012/0140080 A1 | 6/2012 | Taylor et al. |

\* cited by examiner

VEHICULAR IMAGING SYSTEM WITH CONTROLLED ILLUMINATION DEVICE AND CAMERA

CROSS REFERENCE TO RELATED APPLICATIONS

The present application is a continuation of U.S. patent application Ser. No. 12/693,681, filed Jan. 26, 2010, now U.S. Pat. No. 8,964,032, which claims the benefits of U.S. provisional application Ser. No. 61/148,457, filed Jan. 30, 2009.

FIELD OF THE INVENTION

The present invention relates to an illumination system for the rear of a vehicle, and more particularly to an illumination system that is used in conjunction with a back-up camera at the rear of a vehicle.

BACKGROUND OF THE INVENTION

Illumination systems for illuminating rearwardly behind a vehicle generally suffer from several problems. A first problem is that a typical system does not provide strong illumination and does not illuminate a field of view that extends very far behind the vehicle. However, government regulations in some jurisdictions limit the amount of illumination that can be provided in an effort to protect onlookers, such as drivers of other vehicles from being blinded or otherwise distracted by such illumination. It would be advantageous to be able to better illuminate rearwardly behind a vehicle without significantly distracting onlookers.

Additionally, some vehicles are equipped with back-up cameras, however, with the poor illumination provided by a typical rear illumination system, the back-up camera may not be able to gather enough light to provide useful information to the driver of the vehicle. It would be advantageous to be able to assist the camera in providing useful information to the driver.

SUMMARY OF THE INVENTION

In a first aspect, the invention is directed to an illumination system for rearward illumination for a first vehicle. The illumination system includes a tail lamp assembly, a sensor and a controller for controlling the operation of the tail lamp assembly. If the controller determines that there are any oncoming second vehicles behind the first vehicle that are sufficiently close to the first vehicle, then the controller operates the tail lamp assembly in one mode. If the controller determines that there are no oncoming second vehicles behind the first vehicle that are sufficiently close to the first vehicle, then the controller permits the operation of the tail lamp assembly in another mode.

In one embodiment of the first aspect, the tail lamp assembly is operable in the first mode to cast light over a first field of illumination, and in the second mode to cast light over a second field of illumination that extends farther from the first vehicle than the first field of illumination. The controller is configured to receive signals from the sensor and to make a determination of whether there are any oncoming second vehicles behind the first vehicle that are closer than a selected threshold proximity to the first vehicle, and wherein the controller is configured to operate the tail lamp assembly in the first mode based at least in part on if the determination is positive.

In a second aspect, the invention is directed to an illumination system for rearward illumination for a vehicle, including a tail lamp assembly configured to cast light on a field of illumination, a tail lamp assembly controller configured to operate the tail lamp assembly in a repeating cycle that includes a first illumination period wherein the tail lamp assembly has a first brightness level, and a second illumination period wherein the tail lamp assembly has a second brightness level that is lower than the first brightness level, at a frequency that may be sufficient for an onlooker to see the tail lamp assembly as being continuously lit at a third brightness level that is between the first and second brightness levels. A camera is provided and is configured to receive video input from at least part of the field of illumination. A camera controller is provided and is configured to cause the camera to send camera signals related to video input received by the camera to a camera signal receiver during at least part of the first illumination period and to stop the camera from sending camera signals to the camera signal receiver during at least part of the second illumination period. The camera signal receiver may send the camera signals to one or more other devices such as a display, a signal processor, and an obstruction detection processor.

In a third aspect, the invention is directed to an illumination system for rearward illumination for a vehicle, including a tail lamp assembly configured to cast light on a field of illumination, a tail lamp assembly controller configured to operate the tail lamp assembly in a repeating cycle that includes a first illumination period wherein the tail lamp assembly has a first brightness level, and a second illumination period wherein the tail lamp assembly has a second brightness level that is lower than the first brightness level, a camera configured to receive video input from at least part of the field of illumination, and a camera signal processor that is configured to receive camera signals from the camera and to process the camera signals to remove portions thereof corresponding to video input received by the camera during the second illumination period. The camera signal processor may send the processed camera signals to one or more other devices such as a display and an obstruction detection processor.

BRIEF DESCRIPTION OF THE DRAWINGS

The present invention will now be described by way of example only with reference to the attached drawings, in which.

DETAILED DESCRIPTION OF THE INVENTION

Figure 1:
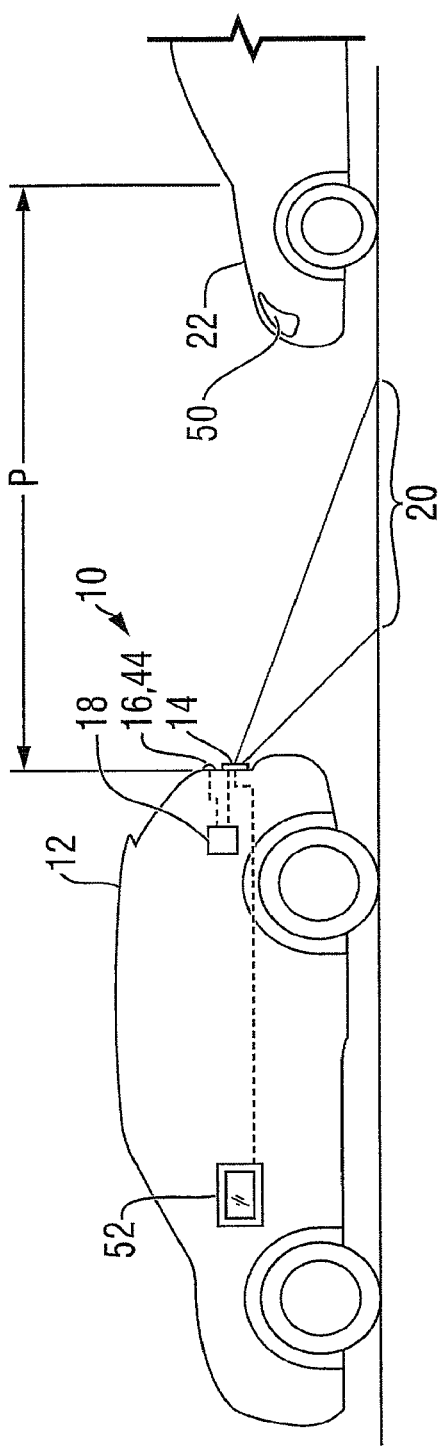
FIG. 1 is a side view of a vehicle equipped with an illumination system in accordance with an embodiment of the present invention, wherein the illumination system includes a tail lamp assembly operating in a first mode.

Reference is made to FIG. 1, which shows an illumination system 10 for rearward illumination for a first vehicle 12. The illumination system 10 assists a vehicle driver to see when driving the first vehicle 12 in reverse, while having a low impact on drivers of other vehicles that may be behind the first vehicle 12.

The illumination system 10 includes a tail lamp assembly 14, a sensor 16 and a controller 18. The tail lamp assembly 14 is operable in two different modes, illustrated in FIGS. 1 and 2. The first mode is shown in FIG. 1, and is the mode wherein the tail lamp assembly 14 operates with to cast light over a first field of illumination, shown at 20. The first field of illumination 20 may be angled downwards from the first vehicle 12 so as to illuminate an area of the road that is several meters behind the first vehicle 12. The tail lamp assembly 14 may operate at a first brightness level when in the first mode. The first brightness level and the first field of illumination 20 are selected to make it relatively unlikely to blind drivers of any oncoming second vehicles shown at 22 that are behind the first vehicle 12 when the tail lamp assembly 14 is in the first mode.

Figure 2:
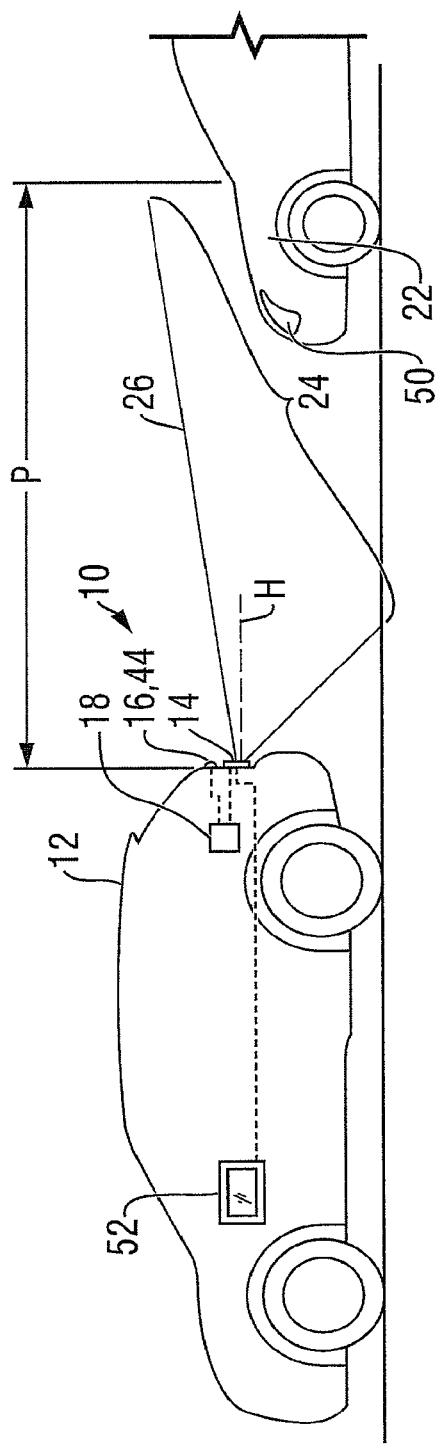
FIG. 2 is a side view of the vehicle shown in FIG. 1, with the tail lamp assembly operating in a second mode.

The second field of illumination is shown at 24 in FIG. 2. The second field of illumination 24 is selected to extend farther behind the first vehicle 12 than the first field of illumination 24. The upper edge of the second field of illumination 24 is shown at 26 and may extend approximately along or above the horizontal (shown at H) thereby illuminating the road generally behind the first vehicle 12. The second brightness level may be selected to be relatively strong so as to assist in providing illumination that extends relatively farther down the road than when the tail lamp assembly 14 is in the first mode.

Figure 3:
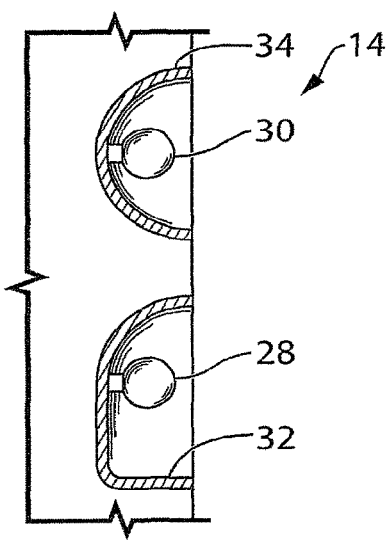
FIG. 3 is a magnified side view of a tail lamp assembly that may be used in the illumination system shown in FIG. 1.

An exemplary embodiment of the tail lamp assembly 14 is shown in more detail in FIG. 3. The tail lamp assembly 14 may include a first tail lamp 28 that is illuminated when the tail lamp assembly 14 is in the first mode and a second tail lamp 30 that is illuminated (either alone or in addition to the first tail lamp 28) when the tail lamp assembly 14 is in the second mode. The tail lamp assembly 14 may further include a first reflector 32 positioned to direct light emitted by the first tail lamp 28 and a second reflector 34 that is positioned to direct light by the second tail lamp 30. The first reflector 32 may be configured to direct light from the first tail lamp 28 to illuminate the first field of illumination 20 (FIG. 1). In an embodiment wherein only the second tail lamp 30 (FIG. 3) is illuminated when the tail lamp assembly 14 is in the second mode, the second reflector 34 may be configured to direct light from the second tail lamp 30 about the entirety of the second field of illumination 24 (FIG. 2). In an embodiment wherein both the first and second tail lamps 28 and 30 (FIG. 3) are illuminated when the tail lamp assembly is in the second mode, the second reflector 34 may be configured to direct light from the second tail lamp 30 about a selected portion of the second field of illumination 24 (FIG. 2), while the first reflector 32 (FIG. 3) directs light from the first tail lamp 28 about another selected portion of the second field of illumination 24 (FIG. 2).

The tail lamps 28 and 30 may be any suitable type of lamps. For example, one or both of the tail lamps 28 and 30 may be made up of light emitting diodes (LEDs), halogen bulbs, high intensity discharge bulbs, or any combination thereof.

Figure 4:
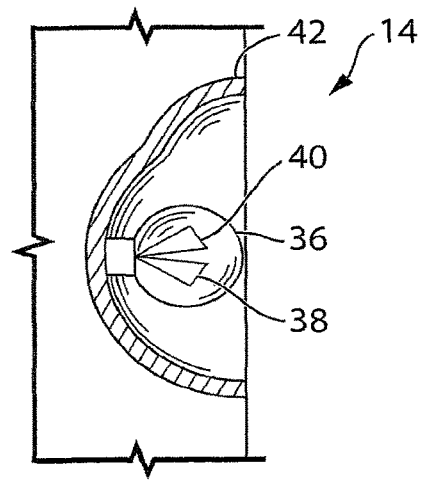
FIG. 4 is a magnified side view of an alternative tail lamp assembly that may be used in the illumination system shown in FIG. 1.

Instead of having first and second tail lamps 28 and 30, the tail lamp assembly 14 may have a single tail lamp 36 shown in FIG. 4, that provides the illumination for both the first mode and the second mode. The single tail lamp 32 may be a halogen bulb that includes a first filament 38 that is illuminated when the tail lamp assembly 14 is in the first mode and a second filament 40 that is illuminated (either in addition to, or instead of, the first filament 38) when the tail lamp assembly 14 is in the second mode. The first and second filaments 38 and 40 may be positioned to cooperate with a reflector 42 that is configured to direct light from them as needed to illuminate the first and second fields of illumination 20 and 24 (FIGS. 1 and 2 respectively).

Referring to FIG. 1, the sensor 16 is positioned to sense the presence of oncoming second vehicles 22 that are behind the first vehicle 12, and may have any suitable structure for this purpose. For example, the sensor 16 may be a camera 44 that faces rearwardly on the first vehicle 12. The camera 44 receives video input and sends camera signals related to the received video input to the controller 18.

The controller 18 is configured to receive the camera signals and to make a determination as to whether there are any second vehicles 22 behind the tail lamp assembly 14 that are closer than a selected proximity shown at P. Additionally, the controller 18 may also make determinations regarding one or more other criteria, such as, for example, the angles of any oncoming second vehicles 22 in relation to the first vehicle 12. If the determination made by the controller 18 is positive (i.e., it determines that there are one or more oncoming second vehicles 22 that are closer than the threshold proximity P), the controller 18 puts the tail lamp assembly 14 into the first mode so as not to blind the drivers of those other second vehicles 22. If the determination is negative, the controller 18 permits the tail lamp assembly 14 to be operated in the second mode. For example, upon making a negative determination the controller 18 would permit the driver of the first vehicle 12 to activate the second mode for the tail lamp assembly 14 via a control switch in the vehicle cabin (not shown). Alternatively, upon a negative determination the controller 18 may be configured to by itself activate the second mode for the tail lamp assembly 14.

The selected proximity P may be any suitable value. For example, the value of P may be effectively infinity. In other words, the controller 18 may be configured to switch the tail lamp assembly 14 to the first mode upon determining that any oncoming second vehicles 22 are behind the tail lamp assembly 14 regardless of their distance from the tail lamp assembly 14. As an alternative, the selected proximity P may be selected to prompt a positive determination by the controller 18 if an oncoming second vehicle 22 is within the second field of illumination 24 (FIG. 2). In other words, the controller 18 may be configured to switch the tail lamp assembly 14 to the first mode upon determining that any oncoming second vehicles are within the second field of illumination (FIG. 2).

Figure 5:
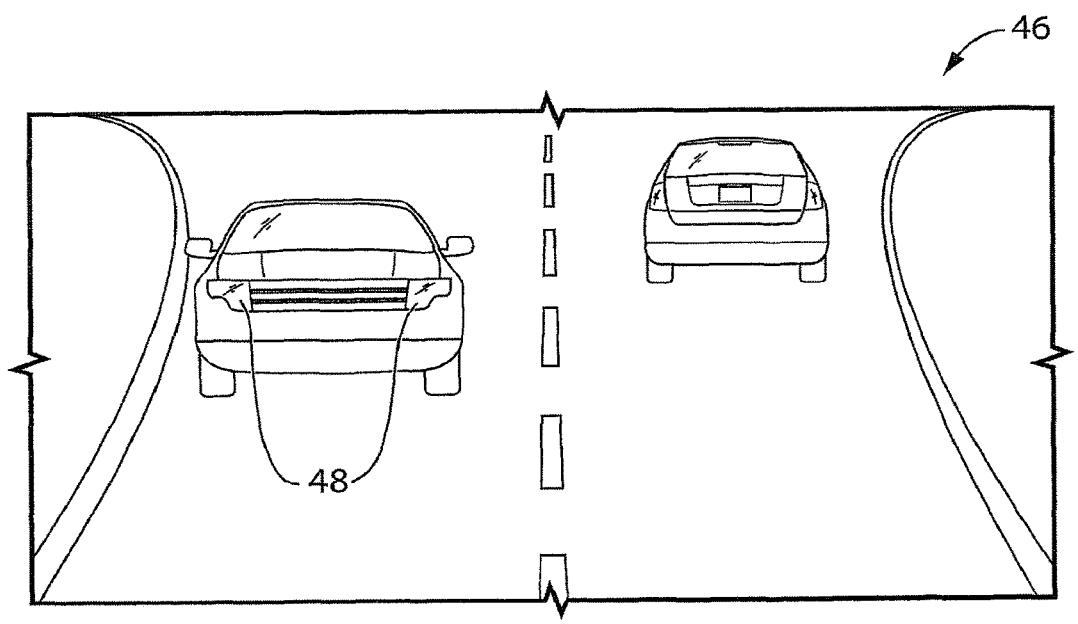
FIG. 5 is an exemplary image from video input that received by a camera that is part of the illumination system shown in FIG. 1.

FIG. 5 shows an exemplary image 46 from the video input received by the camera 44. The controller 18 may detect oncoming second vehicles 22 by determining if the image 46 received by the camera 44 contains any headlight images, examples of which are shown at 48. Oncoming second vehicle headlights, shown at 50 in FIGS. 1 and 2, may for example, have a characteristic appearance when appearing as headlight images 48 (FIG. 5) in the video input received by the camera 44 (FIG. 1). This characteristic appearance may be detectable by the controller 18. The controller 18 may be further configured to determine the approximate distance of any detected vehicle headlights 50 to the tail lamp assembly 14. For example, the controller 18 may estimate the distance of any detected vehicle headlights 50 based at least in part on the size of the headlight images 48 (FIG. 5) and on the apparent brightness level of the headlight images 48. A relatively larger and/or brighter headlight image 48 may be interpreted as being indicative of an oncoming second vehicle 22 (FIG. 1) that is relatively closer to the tail lamp assembly 14, while a relatively smaller and/or less bright headlight image 48 (FIG. 5) may be interpreted as being indicative of an oncoming second vehicle 22 (FIG. 1) that is relatively farther from the first vehicle 12.

In addition to being used to sense the presence of oncoming vehicles 22 from behind, the camera 44 may also send camera signals for use in displaying video output on a display shown at 52 inside the vehicle cabin (not shown).

By providing the rearview illumination system 10, the vehicle driver can more safely back the first vehicle 12 up with increased capability to see obstructions behind the first vehicle 12 while maintaining a relatively low impact on drivers in any oncoming second vehicles 22 that are behind the first vehicle 12 by keeping the tail lamp assembly 14 in a first mode that is less likely to blind drivers of second vehicles 22. In embodiments wherein the camera 44 is connected to the display 52, the rearview illumination system 10 is also advantageous, since the video output that is displayed on the display 52 can be particularly improved by the illumination provided when the tail lamp assembly 14 is in the second mode.

Figure 6:
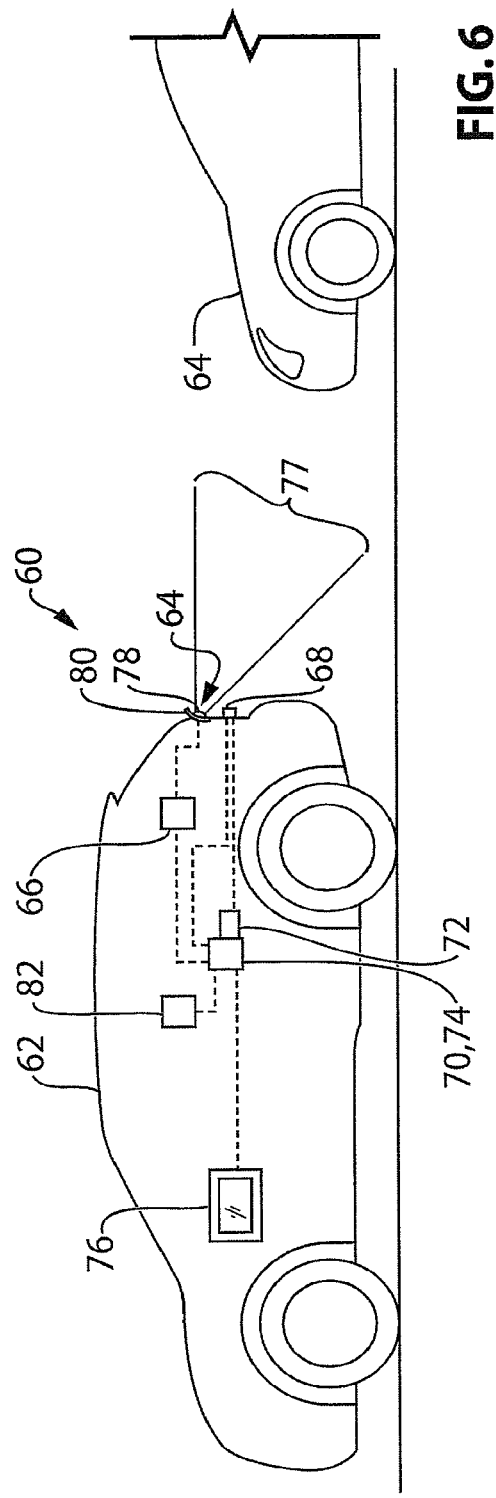
FIG. 6 is a side view of a vehicle equipped with an illumination system in accordance with another embodiment of the present invention.

Reference is made to FIG. 6, which shows an illumination system 60 for rearward illumination for a first vehicle 62 in accordance with another embodiment of the present invention. The illumination system 60 is configured to provide a relatively highly illuminated video output that is used for purposes of identification of obstructions behind the first vehicle, while having a relatively low brightness when seen by onlookers behind the first vehicle 62 including pedestrians and drivers of oncoming second vehicles 64 that are behind the first vehicle 62. The illumination system 60 includes a tail lamp assembly 64, a tail lamp assembly controller 66, a camera 68 and a camera controller 70, a camera signal receiver 72, a camera signal processor 74 and a display 76.

The tail lamp assembly 64 is configured to cast light on a field of illumination 77, which may have any suitable size and shape. The tail lamp assembly 64 includes a tail lamp 78 and optionally further includes a reflector 80 configured to assist in directing light from the tail lamp 78 about the field of illumination 77. The tail lamp 78 may include any type of light emitting element. For example, the tail lamp 78 may include a plurality of LEDs, or a halogen bulb, or a high-intensity discharge (HID) bulb.

Figure 7:
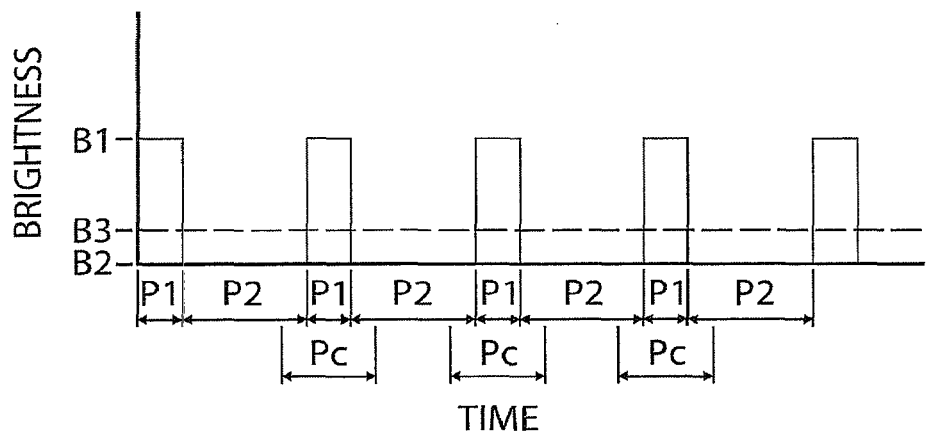
FIG. 7 is a graph illustrating the operation of elements from the illumination system shown in FIG. 6.

With reference to FIGS. 6 and 7, the tail lamp assembly controller 66 is configured to operate the tail lamp assembly 64 in a repeating cycle shown at P in FIG. 7, that includes a first illumination period P1 wherein the tail lamp assembly 64 has a first brightness level B1, and a second illumination period P2 wherein the tail lamp assembly 64 has a second brightness level B2 that is lower than the first brightness level B1. The cycle P of first and second brightness levels B1 and B2 may be repeated at a selected frequency F (not shown in the figures). When the frequency F is sufficiently high the tail lamp assembly 64 may appear to an onlooker as being lit at a constant third brightness level, which is shown in FIG. 7 at B3, which is between the first and second brightness levels B1 and B2. Specifically, the third brightness level may approximately be a weighted average brightness level between B1 and B2 taking into account the lengths of the first and second illumination periods P1 and P2. It is preferable that the cycle P is repeated at the aforementioned sufficiently high frequency so that the tail lamp assembly 64 appears to be lit with a constant third brightness B3 to onlookers.

The first brightness level B1 may be selected to be sufficiently bright to permit the camera to receive video input with a selected amount of detail, but may be considered excessively bright to onlookers if the tail lamp assembly 64 were operated solely at the first brightness level B1. The second brightness level B2 may be selected to be zero. In other words, the tail lamp assembly 64 may be off during the second illumination period P2. The first illumination period P1 is preferably selected to be as large as possible while keeping the weighted average brightness B3 sufficiently low to avoid blinding an onlooker, such as a driver of an oncoming second vehicle that is behind the first vehicle 62.

In the exemplary embodiment shown in FIG. 7, the first illumination period P1 may be selected to be approximately $\frac{1}{120}$th of a second (i.e., 0.0083 seconds), and the second illumination period P2 may be selected to be approximately $\frac{3}{120}$ths of a second (i.e., 0.025 seconds), providing a frequency of 30 cycles P per second (i.e., 30 Hz). It is theorized that a frequency of about 30 Hz is sufficient for an onlooker to see the tail lamp assembly 64 as being lit at a constant brightness level. Accordingly, a frequency of at least about 30 Hz is theorized as being advantageous.

The camera 68 is configured to receive video input from at least part of the field of illumination 77. The camera controller 70 may be configured to cause the camera 68 to send camera signals related to video input received by the camera 68 to the camera signal receiver 72 during at least part of the first illumination period P1 and to stop the camera 68 from sending camera signals to the camera signal receiver 72 during at least part of the second illumination period P2. In the embodiment shown in FIG. 6, the camera controller 70 is configured to cause the camera 68 to send camera signals relating to video input received by the camera 68 during all of the first illumination period P1. To ensure that all of the video input during the first illumination period P1 is captured, the camera 68 may send camera signals during a camera sending period Pc (shown in FIG. 7) that begins slightly earlier than the start of the first illumination period P1 and ends slightly after the end of the first illumination period P1.

The camera controller 70 may receive timing signals from the tail lamp assembly controller 66 that are indicative of when to cause the camera 68 to send camera signals and when to stop the camera 68 from sending camera signals.

The camera signal receiver 72 receives the camera signals and passes them on to the camera signal processor 74, which is configured to process the camera signals to remove any portions thereof corresponding to video input received by the camera 68 during the second illumination period P2 (i.e., when the tail lamp assembly 64 is at the second, (i.e., lower) brightness level). By removing those portions, the remaining camera signals correspond to video input received by the camera 68 only during the first illumination period P1 (i.e., when the tail lamp assembly 64 is at the first (i.e., higher) brightness level). Performing the processing steps to remove video input from the second period P2 results in processed camera signals, which may be sent to the display 76 for viewing by a driver of the vehicle 62. Alternatively or additionally, the processed camera signals may be further processed by an obstruction detection processor 82 to determine if there is an obstruction present behind the vehicle 62 that should be brought to the attention of the driver. For example, the obstruction detection processor 82 may be configured to further process the processed camera signals, to produce secondarily processed camera signals, that correspond to a displayed video output that includes an icon at the position of a detected obstruction to bring the detected obstruction to the attention of the driver.

The camera signal processor 74, the camera controller 70 and the obstruction detection processor 82 are shown in FIG. 6 to be the same device. It is alternatively possible, however, for one or more of the camera signal processor 74, the camera controller 70 and the obstruction detection processor 82 to be a separate device from the others.

By controlling the illumination of the tail lamp assembly 64 between the first and second brightness levels B1 and B2 as described above, and by controlling the operation of the camera 68 as described above, relatively bright video output may be provided on the display 76 in embodiments wherein the display 76 is provided, and the obstruction detection processor 82 may be able to more easily detect obstructions that would be relatively difficult to detect in low light conditions, in embodiments wherein the obstruction detection processor 82 is provided, while appearing to onlookers as having a selected lower brightness level (i.e., the third brightness level B3) that is less likely than the first brightness level B1 to be considered excessively bright.

Figure 8:
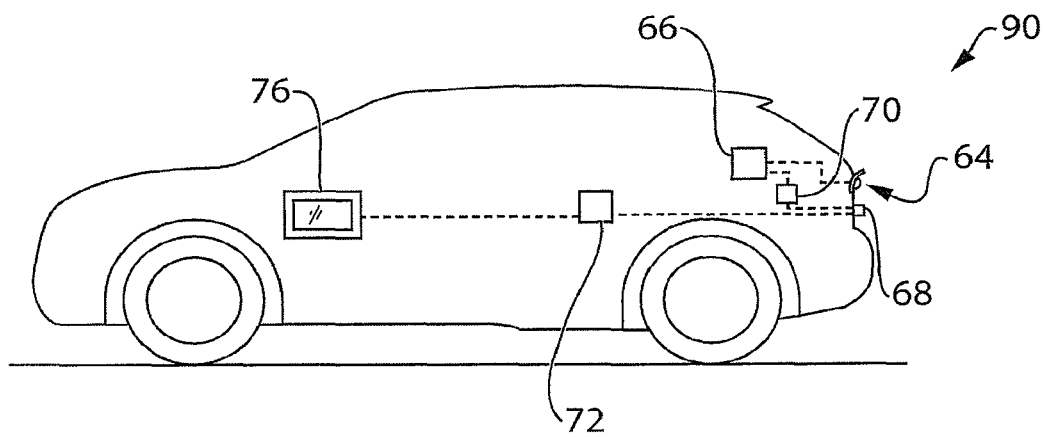
FIG. 8 is a side view of a vehicle equipped with an illumination system in accordance with yet another embodiment of the present invention.

Reference is made to FIG. 8 which shows an alternative illumination system 90 that is similar to the illumination system 60 (FIG. 6), but wherein there is no camera signal processor, and instead the camera signals are sent from the camera signal receiver 72 directly to the display 76. In this alternative, portions of the video output displayed by the display 76 may be based on video input to the camera 68 during the second illumination period P2 (FIG. 7). In such instances the displayed video output may not appear as bright as the displayed video output that results when the camera signal processor 74 removes the portions of the camera signals that are based on video input to the camera 68 during the second illumination period P2 (FIG. 7). It is optionally possible however for the camera controller 70 to operate the camera 68 to send camera signals during a camera sending period Pc that is selected to be within the first illumination period P1 (FIG. 7), so that the displayed video output on the display 76 is bright even without processing by a camera signal processor.

The display 76 in both the embodiments shown in FIGS. 6 and 8 is configured to display video output based on the camera signals sent by the camera 68 to the camera signal receiver 72. The displayed video output may correspond substantially exactly to the camera signals sent by the camera 68 to the camera signal receiver 72, as is the case for the illumination system 90 shown in FIG. 8. Alternatively the displayed video output may correspond substantially exactly to the processed camera signals sent by the camera signal processor 74 in the embodiment shown in FIG. 6, which are themselves based on the camera signals.

It will be noted that the frequency F of the operation of the tail lamp assembly 64 (FIGS. 6 and 8) controls the frequency of the camera signals, which, in turn means that the display 76 may display video output at the frequency F. For the example illumination periods P1 and P2 (FIG. 7) given above (i.e., P1=$\frac{1}{120}$th of a second and P2=$\frac{3}{120}$ths of a second) and in an embodiment wherein all of the video input during the period P1 is captured and sent to the display 76 (FIGS. 6 and 8), the display 76 will receive video signals corresponding to video clips lasting $\frac{1}{120}$th of a second every $\frac{1}{30}$th of a second. When displayed, such video output may nonetheless appear free of discontinuities to the vehicle driver, even though $\frac{3}{120}$ths of every $\frac{1}{30}$th of second are absent from the video output (because during that period the tail lamp assembly 64 is at the second (i.e., lower) brightness level B2).

The term 'a tail lamp assembly' as used herein, and particularly in the accompanying claims, is not intended to be limited to a quantity of one. In other words, it is optionally possible for a plurality of tail lamp assemblies to be controlled or operated as part of the illumination systems described herein. It is contemplated that in many instances two tail lamp assemblies would be provided as part of an illumination system on a vehicle with one tail lamp assembly on each side of the vehicle's longitudinal centerline.

While the above description constitutes a plurality of embodiments of the present invention, it will be appreciated that the present invention is susceptible to further modification and change without departing from the fair meaning of the accompanying claims.

The invention claimed is:

1. A imaging system for capturing images rearward of a vehicle, the imaging system comprising:
a tail lamp assembly configured for mounting at a rear portion of a vehicle equipped with the imaging system, wherein the tail lamp assembly includes at least one light source that, when activated, emits light, and wherein, with the tail lamp assembly mounted at the equipped vehicle and with the at least one light source activated, the tail lamp assembly emits light that illuminates a field of illumination rearward of the equipped vehicle;
a light source control that operates at least one light source of the tail lamp assembly, wherein, with the tail lamp assembly mounted at the equipped vehicle, the light source control operates the at least one light source in a repeating cycle that includes (i) a first illumination period wherein light emitted by the tail lamp assembly has a first brightness level, and (ii) a second illumination period wherein light emitted by the tail lamp assembly has a second brightness level that is lower than the first brightness level;
a camera configured for mounting at the equipped vehicle, wherein, with the camera mounted at the equipped vehicle, and with the tail lamp assembly mounted at the rear portion of the equipped vehicle, and with the at least one light source activated, the camera captures image data representative of a region that is at least in part encompassed by the field of illumination;
a camera control that controls the camera, wherein the camera control, with the camera mounted at the equipped vehicle, and with the tail lamp assembly mounted at the rear portion of the equipped vehicle, and with the at least one light source operated by the light source control in the repeating cycle, controls the camera to capture image data during at least part of the first illumination period and the camera control controls the camera to not capture image data during at least part of the second illumination period; and
wherein the light source control operates the at least one light source in a repeating cycle that repeats sufficiently frequently such that the at least one light source, with the tail lamp assembly mounted at the rear portion of the equipped vehicle and when the at least one light source is operated in the repeating cycle, appears to onlookers to be illuminated at a constant third brightness level that is lower than the first brightness level and higher than the second brightness level.

2. The imaging system of claim 1, wherein the light source control deactivates the at least one light source of the tail lamp assembly during the second illumination period.

3. The imaging system of claim 1, further comprising a display device configured to display video images derived from image data captured by the camera.

4. The imaging system of claim 3, wherein the display device displays images derived from image data captured by the camera during the first illumination period and does not display images derived from image data captured by the camera during the second illumination period.

5. The imaging system of claim 1, further comprising an image processor that processes image data captured by the camera to remove image data captured by the camera during the second illumination period.

6. The imaging system of claim 5, wherein the image processor processes image data captured by the camera during the first illumination period to detect objects present in the region that is at least in part encompassed by the field of illumination.

7. The imaging system of claim 1, wherein the repeating cycle repeats at least about 30 times per second.

8. The imaging system of claim 1, wherein the camera control receives timing signals from the light source control indicative of when to operate the camera to capture image data and when to operate the camera to not capture image data.

* * * * *